United States Patent
Weule

(10) Patent No.: US 7,866,226 B2
(45) Date of Patent: Jan. 11, 2011

(54) ELECTROMOTIVE ACTUATOR FOR DEFLECTING A MECHANICAL PART

(75) Inventor: Jan Weule, Duisburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 589 days.

(21) Appl. No.: 11/852,452

(22) Filed: Sep. 10, 2007

(65) Prior Publication Data

US 2008/0064505 A1 Mar. 13, 2008

(30) Foreign Application Priority Data

Sep. 9, 2006 (DE) ........................ 10 2006 042 478

(51) Int. Cl.
*F16D 23/12* (2006.01)
*F16D 23/00* (2006.01)
*F16D 27/00* (2006.01)

(52) U.S. Cl. .................. 74/99 A; 192/30 W; 192/84.6; 192/93 A; 192/98; 310/49.18; 310/80

(58) Field of Classification Search .............. 192/84.6, 192/89.21, 90; 310/12.14, 20, 37, 49.18, 310/80; 74/89.35, 99 A See application file for complete search history.

(56) References Cited

U.S. PATENT DOCUMENTS

| | | | | |
|---|---|---|---|---|
| 1,713,549 A | * | 5/1929 | Ott | 74/99 A |
| 3,404,580 A | * | 10/1968 | Valenti | 74/89.35 |
| 4,805,486 A | | 2/1989 | Hagiwara et al. | |
| 4,865,173 A | * | 9/1989 | Leigh-Monstevens et al. | 192/90 |
| 4,934,503 A | * | 6/1990 | Bacher et al. | 192/93 A |
| 5,806,646 A | * | 9/1998 | Grosspietsch et al. | 192/89.21 |
| 5,964,330 A | | 10/1999 | Organek et al. | |
| 6,460,677 B1 | * | 10/2002 | Roscoe | 192/93 A |
| 6,688,445 B2 | * | 2/2004 | Otto | 192/30 W |
| 6,848,550 B2 | * | 2/2005 | Puiu et al. | 192/84.6 |
| 2004/0119465 A1 | * | 6/2004 | Clark | 324/174 |
| 2005/0205376 A1 | * | 9/2005 | Kemper | 192/84.6 |
| 2007/0163856 A1 | * | 7/2007 | Kemper | 192/94 |

FOREIGN PATENT DOCUMENTS

| | | |
|---|---|---|
| DE | 698 03 346 T2 * | 1/2002 |
| DE | 10348312 | 5/2005 |
| DE | 102006006640 | 4/2007 |
| EP | 0368140 | 5/1990 |
| JP | 2003-022160 | 1/2003 |
| WO | 99/64756 | 12/1999 |

* cited by examiner

*Primary Examiner*—Rodney H Bonck
(74) *Attorney, Agent, or Firm*—Leydig, Voit & Mayer, Ltd.

(57) ABSTRACT

An electromotive actuator for deflecting a mechanical part, comprising a rotatable component and a non-rotatable component of a deflection gear, whereby the rotatable component can be driven by an electric motor in such a way that it can be moved linearly relative to the non-rotatable component between a first position and a second position. The two components of the actuator are constituents of a ball-ramp adjustment device, whereby a rotatable component of the ball-ramp adjustment device is non-rotatably connected to the rotor of the electric motor and acts directly or indirectly on the mechanical part that is to be deflected.

28 Claims, 3 Drawing Sheets

ELECTROMOTIVE ACTUATOR FOR DEFLECTING A MECHANICAL PART

Priority is claimed to German Patent Application No. DE 10 2006 042 478.6, filed on Sep. 9, 2006, the entire disclosure of which is incorporated by reference herein.

The present invention relates to an electromotive actuator for deflecting a mechanical part, including a rotatable component and a non-rotatable component of a deflection gear, the rotatable component driveable by an electric motor in such a way that it can be moved linearly relative to the non-rotatable component between a first position and a second position,

BACKGROUND

Modern vehicles contain a relatively large number of electric actuators with which the rotational movement generated by an electric motor that can be actuated by a control device is converted into a linear or rectilinear movement of the vehicle component that is to be moved. A special area of application of such actuators is in the automatic actuation of a starting and shifting clutch of a motor vehicle, whereby the component that is to be actuated can be, for example, a so-called central clutch release device of the friction clutch. During actuation, such a central clutch release device acts, for example, on the diaphragm spring of the clutch in such a way that it is released or brought into a slip position in which the clutch can transmit no torque at all or only a reduced torque from the drive engine of the vehicle to the gear.

Various deflection gears have become known for purposes of converting the rotational movement of the rotor of the electric motor into a rectilinear movement. Thus, for example, deflection gears are used in conjunction with actively controllable multi-disk clutches and these deflection gears are used on axle or middle differentials as differential locks and in a power train with selectable four-wheel drive as a selectable clutch of a drive axle that can be activated as needed. By means of the deflection gear, an externally generated controlling torque is continuously converted at a high transmission ratio into an axial contact force in order to actuate, that is to say, in order to at least partial close, an associated multi-disk clutch.

Two embodiments of a differential gear with a disk lock that can be actuated by means of an electric motor via such a deflection gear are described in EP 0 368 140 B1. According to a first embodiment, in FIG. 1, the differential gear is configured with a bevel wheel design. A support ring is drive-connected via a bevel wheel of a reduction gear to an electric motor that is affixed to the housing. An adjusting ring is mounted non-rotatably and axially movably on the housing side and is connected directly to the support ring via cam tracks. Hence, a rotation of the support ring is converted into an axial movement of the adjusting ring which is connected—via an axial thrust bearing, via an outer pressure plate that rotates together with the differential cage via several tappets that penetrate the differential cage and via an inner pressure plate—to the multi-disk clutch, whose disks are arranged operatively between the differential cage and one of the two output bevel wheels.

In a second variant according to FIG. 2 in the above-mentioned application, the differential gear is configured with a planetary design. The support ring here is mounted non-rotatably and axially immovably on the housing side. In contrast, the adjusting ring is mounted rotatably and axially movably and, on the one hand, it is drive-connected via the pinion of a reduction gear to an electric motor that is affixed to the housing, and on the other hand, it is connected to the support ring via several ball grooves that ascend on the circumference side and via rolling elements arranged therein. Therefore, a rotation of the adjusting ring is converted by a rolling movement of the rolling elements between the opposing axially ascending ball grooves into an axial movement of the adjusting ring which is connected—via an outer axial thrust bearing, via an outer pressure plate that rotates together with the differential cage, via several first tappets that penetrate the differential cage, via a first inner pressure plate, via an inner axial thrust bearing, via a thrust washer, via several second tappets that penetrate the center pin of the planetary carrier and via a second inner pressure plate—to the multi-disk clutch, whose disks are arranged operatively between the differential cage and the sun wheel of the differential gear.

Another differential gear with a disk lock that can be actuated by means of an electric motor via a similar deflection gear is known from U.S. Pat. No. 4,805,486 A. With this differential gear, a support ring is mounted non-rotatably and axially immovably on the housing side. An adjusting ring is supported rotatably as well as axially movably, and on the one hand, it is drive-connected via the pinion of a reduction gear to an electric motor that is affixed to the housing and, on the other hand, it is connected—either via cam surfaces that ascend on the circumference side (see FIG. 2 there) or via ramp surfaces that ascend on the circumference side and via rolling elements arranged therein (see FIG. 3 there)—to the support ring. A rotation of the adjusting ring is thus converted by a sliding movement of the opposing axially ascending cam surfaces or by a rolling movement of the rolling elements between the opposing axially ascending ramp surfaces into an axial movement of the adjusting ring which is connected—via an outer axial thrust bearing, via an outer pressure plate, via several pistons that penetrate the differential cage and via an inner pressure ring—to the multi-disk clutch, whose disks are arranged operatively between the differential cage and one of the two output bevel wheels of the differential gear.

Only for the sake of completing the known state of the art, reference is hereby made to German patent application DE 103 48 312 A1 that discloses an actuation device for a friction coupling device with which a clutch actuator equipped with the described ball ramps can be actuated by means of a bowden cable.

All of these known deflection gears have in common the fact that the axially ascending ramp and cam surfaces are oriented towards the circumference. As a consequence, the corresponding operative contours are each limited to a relatively small rotational angle sector of the input element, disadvantageously resulting in a relatively small transmission ratio between the rotational movement and the torque of the input element as well as the axial movement and the axial contact force of each associated output element. A precise setting of a desired locking power or closing power by means of the axial contact force acting on the appertaining multi-disk clutch is thus hardly possible and moreover, presupposes a considerable absence of play on the transmission path between the electric actuating drive and the input element. Moreover, there is a need for a very precise manufacture of the cam or ramp surfaces of the input element and output element, as a result of which the production of this component is complicated and hence expensive.

Another deflection gear having ball ramps for an actuator with which a rotational movement can be converted into an axial movement is known from the unpublished German application DE 10 2006 006 640.5. This deflection gear for actuating a multi-disk clutch has a circular disk-shaped input element that can be rotated around a middle axis and that is axially immovable and it also has a non-rotatable, circular disk-shaped output element that can be moved axially along the middle axis. Between the input element and the output element, there are several rolling elements with which a rotation and a torque of the input element can be converted into an axial movement as well as into an axial contact force of the output element by means of a rolling movement of the rolling elements between a first operative contour of the input element and a second operative contour of the output element.

In order to achieve an especially high transmission ratio in conjunction with a structure of the deflection gear that can be produced simply and inexpensively, it is also provided that the first operative contour consists of several geometrically identical guide tracks having a constant axial depth which are arranged equally distributed on the circumference side in the input element, said guide tracks each running diagonally from radially inwards to radially outwards, and which each receive and guide a rolling element configured as a ball, and it is also provided that the second operative contour is configured as a circular conical surface of the output element located axially opposite from the guide tracks of the input element.

SUMMARY OF THE INVENTION

An object of the present invention is to provide a deflection gear of the above-mentioned type that, with a structure that can be produced simply and inexpensively and that is also compact, has an even further increased transmission ratio.

A structural combination of an electric motor with a ball-ramp adjustment device can be very advantageously used to deflect a mechanical part, for example, in a motor vehicle. This relates primarily to parts in the power train of a motor vehicle, for example, a central clutch release device for a friction clutch, but such an actuator can also be used in other technical areas.

The envisaged objective is achieved by the features of the main claim, while advantageous refinements and embodiments of the invention can be gleaned from the subordinate claims.

Accordingly, the present invention is based on an electromotive actuator for deflecting a mechanical part, comprising a rotatable component and a non-rotatable component of a deflection gear, which are arranged coaxially inside each other, whereby the rotatable component can be driven by an electric motor in such a way that it can be moved linearly relative to the non-rotatable component between a first position and a second position.

In order to achieve the envisaged object, it is additionally provided that the two above-mentioned components of the actuator are constituents of a ball-ramp adjustment device, whereby a rotatable component of the ball-ramp adjustment device is non-rotatably connected to the rotor of the electric motor and can act directly or indirectly on the mechanical part that is to be deflected.

In order to be able to achieve a large transmission ratio of the rotational movement of the electric motor into an axial adjusting movement, according to a preferred embodiment of the information, it is provided that the ball-ramp adjustment device has several adjusting rings arranged axially one after the other as well as, at one axial end, a rotatable seat ring and, at the opposite end, a non-rotatable seat ring.

Advantageously, the rotatable seat ring of the ball-ramp adjustment device is firmly connected to an armature seat of the electric motor and the non-rotatable seat ring is firmly connected to a guide tube that is affixed to the housing, whereas the adjusting rings arranged axially between them are held axially and radially by means of balls of the ball-ramp adjustment device that act on the adjusting rings.

According to another embodiment of the invention, it is also provided that the adjusting rings have guide tracks axially facing each other on both sides and the rotatable seat ring as well as the non-rotatable seat ring have such guide tracks on only one side in order to each receive one ball in each guide track.

In order to be able to obtain an adjustment device with low friction, it is preferable that the adjusting rings are not radially supported on their radial circumferential surfaces. In this case, the radial support of the adjusting rings is effectuated exclusively by means of the above-mentioned balls that are each arranged in two opposing guide tracks. According to another variant, it can be provided that these adjusting rings are radially supported at least on their radially inner circumferential surface or on their radially outer circumferential surface by means of a sliding bearing.

In another embodiment, the guide tracks have a different depth over their individual extensions, for which purpose they are preferably configured in the form of a ramp.

Moreover, it can be provided that the axially opposing guide tracks of two adjacent adjusting rings are configured in such a way that they overlap radially as well as circumferentially.

Moreover, the axially opposing guide tracks are configured in such a way that, in order to achieve the largest axial travel of the actuator, the appertaining areas of the guide tracks having the smallest depth are axially opposite from each other and that, in order to achieve the smallest travel (actuator travel=zero), the appertaining areas having the largest depth are axially opposite from each other.

Moreover, it is preferably provided that the armature seat for the armature or rotor of the electric motor is arranged so as to be axially movable with respect to the guide tube by means of the described ball-ramp adjustment device. For this purpose, it can be provided that the armature seat has a ring flange extending radially towards the outside and a ring flange extending radially towards the inside.

Moreover, on the armature seat in the area of its ring flange extending radially towards the inside on its radially outer circumferential surface, there is a thread onto which an armature nut can be screwed. The armature of the electric motor is arranged and clamped between the armature nut screwed onto the armature seat and the ring flange that extends radially towards the outside.

Another embodiment of the invention is characterized in that the guide tube can be connected to a clutch bell housing or to a gear housing. Moreover, it can be provided that the stator winding of the electric motor is attached to a stator yoke that, in turn, is firmly connected to a stator mounting plate, whereby the stator mounting plate is connected to the non-rotatable part.

In order to be able to control the actuation path of an actuator that is configured according to the invention, in another aspect of the invention, said actuator can be equipped with a speed gauge and/or torque angle gauge that detects the rotation of the rotor or of the armature of the electric motor and transmits this value to a control device. For this purpose, it can be provided that a sensor wheel having detectable profiling is clamped between the armature nut and the armature by means of a radial clamping section. Starting from this clamping section, the sensor wheel then has a first axial section that axially overlaps the armature nut and the armature seat, at least partially. Subsequently, there is a radial section on the sensor wheel and this radial section is followed by a second axial section having the detectable profiling. This profiling can be in the form of axial teeth on the outer circumferential surface of the sensor wheel or in the form of axial slits on this outer circumferential surface.

Preferably, a ring-shaped sensor carrier plate is arranged radially above the sensor wheel and said sensor carrier plate is firmly connected via a spacer ring to the above-mentioned stator mounting plate. A speed sensor and/or a torque angle sensor facing radially towards the inside is attached to a sensor carrier plate and the profiling of the sensor wheel can be detected by said speed sensor and/or a torque angle sensor. The sensor carrier plate and the radially outer axial section with the above-mentioned profiling overlap axially so that this component can also assume a housing function.

According to another refinement of the invention, in order to actuate a part that is to be deflected by the actuator, it can be provided that the front surface of the armature seat facing this part can be directly or indirectly operatively connected to this part in order to deflect it. Whereas a direct mechanical contact of the armature seat with the part that is to be deflected can be practical if the part that is to be deflected does not execute a rotational movement, the invention calls for a rotation uncoupling if the part that is to be deflected rotates.

In order to achieve such a rotation uncoupling, it is proposed according to the invention that the front surface of the armature seat facing the part that is to be deflected is operatively connected, for example, to a clutch release bearing that, in turn, acts upon the part that is to be deflected.

According to a refinement of this aspect of the invention, it is provided that the front surface of the armature seat facing the part that is to be deflected can be laid axially against an outer ring of the clutch release bearing, while the front surface of the inner ring of the clutch release bearing facing away from the threaded nut lies against the part that is to be deflected.

Moreover, it can be provided according to the invention that, following the ring flange of the armature seat facing radially towards the inside, there is an outer ring seat on said armature seat, and the outer ring of the clutch release bearing is mounted on said outer ring seat so as to be axially movable (preferably to a limited extent). For this purpose, it is preferably provided that the outer ring of the clutch release bearing has a radially inner axial section with which it lies on an outer ring seat on the armature seat so as to be axially movable.

In this context, another embodiment provides that, in order to guide and rotationally secure the outer ring, bores that are associated with each other are present in the opposing front surfaces of the outer ring and of the armature seat, and a pin that joins these two components with little radial play is inserted into each of these bores.

Moreover, it can be provided that an uncoupling spring is arranged axially between the outer ring of the clutch release bearing and the armature seat, said uncoupling spring preventing a transmission of axial vibrations into the actuator from the part that is to be deflected. Moreover, by means of this uncoupling spring, it can also be achieved that, when the armature seat executes an axial movement away from the part that is to be deflected, this uncoupling spring holds the outer ring of the clutch release bearing in a desired position relative to the inner ring and also holds the inner ring in contact with the part, even when a force exerted by the part onto the inner ring of the clutch release bearing drops to the value of zero. Preferably, the uncoupling spring is configured as a helical compression spring.

In order to affix the armature securely to the armature seat during the entire operating time of the actuator, another embodiment of the invention provides that the thread on the armature seat and on the armature nut are configured so as to be self-locking.

Finally, the invention also claims a vehicle actuation device comprising an actuator that has at least some of the above-mentioned features, whereby the part that has been mentioned several times and that is to be actuated by the actuator is a deflectable component of a starting and shifting clutch or of its diaphragm spring, of a gear brake, of a shift track actuator or of a gear actuator or a slip coupling of a gear coupling device and/or a gear synchronization device of an automatic transmission or of a shifting clutch on a differential gear.

BRIEF DESCRIPTION OF THE DRAWINGS

In order to elucidate the invention, the description is followed by a drawing in which an embodiment of an actuator structured according to the invention is depicted. This drawing shows the following.

DETAILED DESCRIPTION

Figure 1:
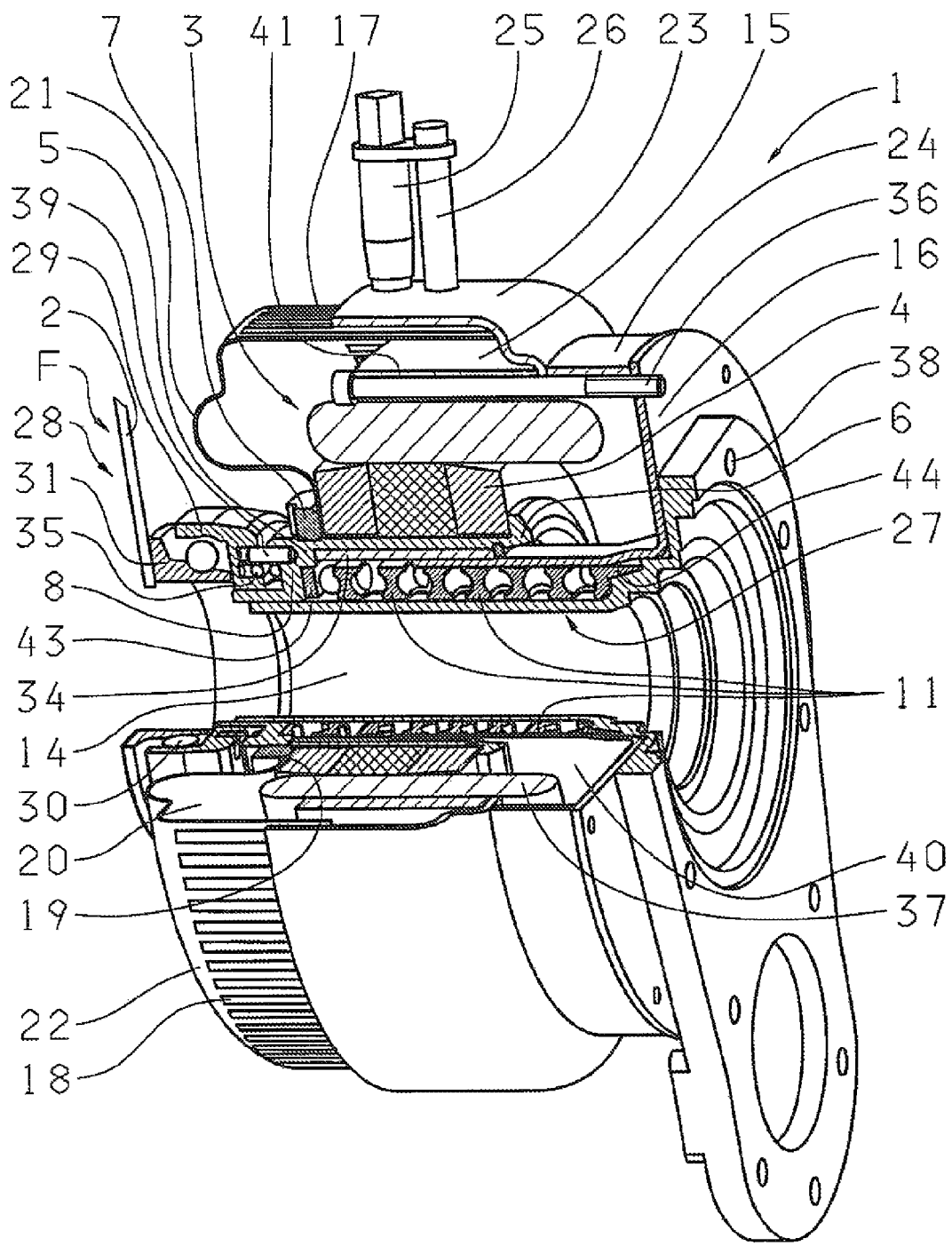
FIG. 1—an actuator according to the invention with a ball-ramp adjustment device in a partially cutaway perspective view.

Accordingly, FIG. 1 shows an electromotive actuator 1 configured according to the invention, in a perspective and cutaway view. The part that is to be actuated in this embodiment is a vehicle component, especially a diaphragm spring 2 of a friction clutch, that is used as starting and shifting clutch in conjunction with an automatic transmission. Here, the actuator 1 is configured as a so-called central clutch release device that opens or closes the friction clutch as a function of control commands of a control device (not shown here) or else that brings it into certain slip operational positions.

For this purpose, the actuator 1 has an electric motor 3 that can be operated in two rotational directions, as a function of the particular actuation. This electric motor 3 is connected to a deflection gear in the form of a ball-ramp adjustment device 27 that converts the rotational movement of the electric motor 3 into an axial, linear movement of the control unit of the actuator 1 so that ultimately, the diaphragm spring 2 can be axially deflected.

Below, the structural design of this actuator 1 will be discussed in greater detail. In a generally known design, the electric motor 3 has a stator and a rotor. The stator is formed by a stator winding 37 and a stator yoke 15 that carries this winding. There are several bores 41 in the stator yoke 15 and a fastening screw 36 is inserted through each of these bores. The fastening screws 36 are screwed into bores of a mounting plate 16 that is attached to a non-rotatable component of the vehicle, for example, to a gear housing.

At a radial distance from the stator winding 37, an armature 4 of the electric motor 3 is arranged on a rotatable component of the ball-ramp adjustment device 27. This rotatable component is configured as a so-called armature seat 5 that, at its end situated away from the diaphragm spring, has a ring flange 6 facing radially towards the outside and, at its end situated close to the diaphragm spring, has a ring flange 8 facing radially towards the inside. In the radially outer circumferential surface 42 of the armature seat, in the area of the ring flange 8 facing radially towards the inside, there is a self-locking thread 10 (see FIG. 3) onto which an armature nut 7 with a corresponding thread is screwed. The armature 4 is arranged and clamped between the armature nut 7 and the ring flange 6 facing radially towards the outside.

According to the invention, this actuator 1 is especially structured in such a way that a rotatable component 43 of the ball-ramp adjustment device 27 is non-rotatably connected to the armature 4 or to the armature seat 5 of the electric motor 3 and acts directly or indirectly on the mechanical part 2 that is to be deflected.

In order to achieve this functional principle and in order to achieve the largest possible transmission ratio between the rotational movement of the electric motor 3 and the desired axial adjusting movement, according to FIGS. 1 to 4, it is provided that the ball-ramp adjustment device 27 has several adjusting rings 11a to 11f arranged axially one after the other, as well as a rotatable seat ring 43 on one axial end and a non-rotatable seat ring 44 on the opposite end. Here, the rotatable arranged seat ring 43 is connected non-rotatably to the armature seat 5, and the non-rotatable seat ring 44 is connected to a hollow-cylindrical guide tube 14 that is affixed to the housing, whereby the guide tube 14 can be attached, for example, to the above-mentioned gear housing.

For a low-friction operation of this actuator 1, it is preferable that the adjusting rings 11a to 11f are either radially not supported or else are radially supported at least via a sliding bearing 34 on at least one of its two radial surfaces. In the embodiment according to FIGS. 1 and 3, the sliding bearing 34 is configured on the radially inner circumferential surface of the armature seat 5 or else attached there in the form of a sliding bearing bush radially above the adjusting rings 11a to 11f.

Figure 2:
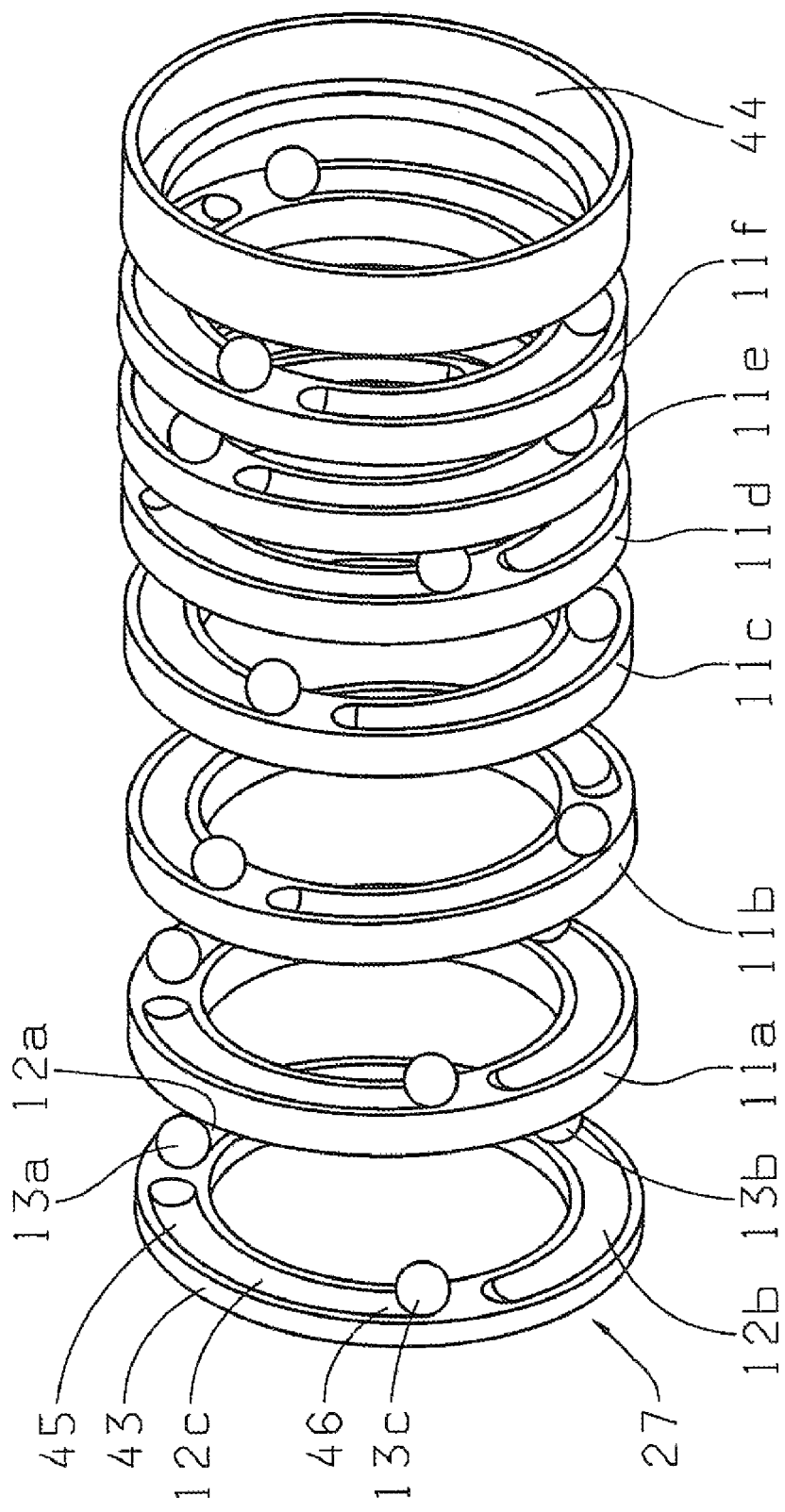
FIG. 2—the ball-ramp adjustment device of the actuator according to FIG. 1 in an enlarged and separate view.
Figure 4:
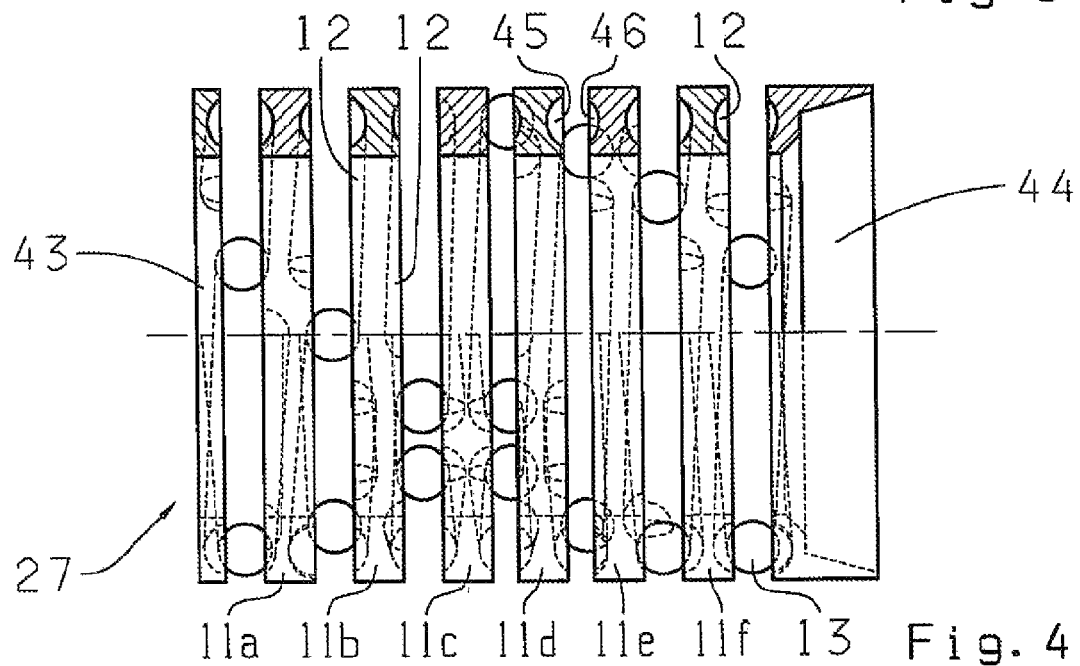
FIG. 4—a cross section through the ball-ramp adjustment device according to FIG. 2.

FIGS. 2 and 4 show the ball-ramp adjustment device 27 of the actuator 1 in a separate depiction so that its structure according to the invention can be clearly seen. Accordingly, in the embodiment shown, six adjusting rings 11a to 11f are arranged axially one after the other, whereas the axial ends of this ball-ramp adjustment device 27 on the left-hand side of the drawing are formed by the seat ring 43 on the armature side and, on the opposite side, by the seat ring 44 on the guide tube side. Each of the two front surfaces of the six adjusting rings 11a to 11f have three guide tracks 12a, 12b, 12c in which a ball 13a, 13b, 13c arranged there can roll. In contrast to this, the rotatable seat ring 43 and the non-rotatable seat ring 44 are only provided on one side with guide tracks 12a, 12b, 12c facing each other for an associated ball 13a, 13b, 13c.

The guide tracks 12a, 12b, 12c of the adjusting rings 11a to 11f and of the rotatable seat ring 43 as well as of the non-rotatable seat ring 44 have a different depth, as seen along their extensions, so that the balls 13a, 13b, 13c sink in to different depths relative to the circumference when they roll in these guide tracks 12a, 12b, 12c. FIGS. 2 and 4 show that the guide tracks 12a, 12b, 12c are configured in the form of a ramp.

Moreover, the axially opposing guide tracks 12a, 12b, 12c of two adjacent adjusting rings 11a to 11f or else of the adjusting rings 11a, 11f and the seat rings 43, 44 are configured in such a way that their guide tracks 12a, 12b, 12c overlap radially. The term "radial overlap" means that the guide tracks have the same boundary lines in an axial projection.

Furthermore, the axially opposing guide tracks 12a, 12b, 12c are configured in such a way that, in order to achieve the largest axial travel of the actuator 1, the appertaining areas 46 having the smallest depth are axially opposite from each other and, in order to achieve the smallest travel (actuator travel=zero), the appertaining areas 45 of the guide tracks having the largest depth are axially opposite from each other. Thanks to this structure, it is possible for the armature seat 5 to be arranged so as to be axially movable on the guide tube 14 by means of the ball-ramp adjustment device 27.

When the electric motor 3 is energized in order to deflect the diaphragm spring 2 by means of the actuator 1, its armature 4 is driven so that it rotates. Since the armature 4 is non-rotatably connected to the armature seat 5, the armature seat 5 also rotates, along with the rotatable seat ring 43 that is clamped to the armature seat. The rotation of this seat ring 43 on the armature side—through the movement of its guide tracks 12a, 12b, 12c facing the adjusting rings 11a to 11f—causes the balls 13a, 13b, 13c arranged in these guide tracks 12a, 12b, 12c to roll in the direction of the guide track area 46 having the smallest depth. The balls 13a, 13b, 13c then also roll in the guide tracks 12a, 12b, 12c of the axially nearest adjusting ring 11a so that the balls 13a, 13b, 13c can drive the seat ring 43 and the adjusting ring 11a apart from each other.

Since the adjusting ring 11a, like all of the other axially subsequent adjusting rings 11a to 11f and the seat ring 44 on the guide tube side are ultimately axially supported on the guide tube 14 so as to be affixed to the housing, an axial force acts, via the seat ring 43 located on the armature seat side, on the armature 5, which moves the latter to the left as shown in FIGS. 1 to 4, that is to say, away from the seat ring 44 located on the guide tube side and towards the diaphragm spring 2 that is to be deflected.

As soon as the balls 13a, 13b, 13c have reached the end of the guide tracks 12a, 12b, 12c of the seat ring 43 on the armature seat side and of the first adjusting ring 11a having the smallest depth 46, said balls 13a, 13b, 13c become blocked during a further rotational movement of the seat ring 43 in the same direction, so that the first adjusting ring 11a is now rotated together with the seat ring 43 as a block. As a result, the balls 13a, 13b, 13c of the set of balls that are axially closest in the direction of the seat ring 44 on the guide tube side also roll in the guide tracks 12a, 12b, 12c of the axially closest adjusting ring 11b in the direction of the smallest guide track depth 46, so that, as just described, an additional axial force acts upon the seat ring 43 on the armature side and on the armature seat 5. This axial force drives the armature seat 5 further in the direction of the diaphragm spring 2 that is to be deflected. This process continues as long as the electric motor 3 is being operated with the same direction of rotation. The maximum actuator travel in the direction of the diaphragm spring 2, however, is reached when all of the balls 13a, 13b, 13c on the individual adjusting rings 11a to 11f and on the two seat rings 43, 44 find themselves in the guide track area 46 having the smallest depth.

The described ball-ramp adjustment device 27, with its six adjusting rings 11a to 11f and its two seat rings 43 and 44 at its two ends, has a total of fourteen effective guide track sides that can effectuate an adjustment, each with three guide tracks 12a, 12b, 12c. The guide tracks have an extension angle of preferably 100° each as well as an adjustment-effective depth difference of 2.5 mm each. This yields a maximum possible actuator travel of 35 mm.

Figure 3:
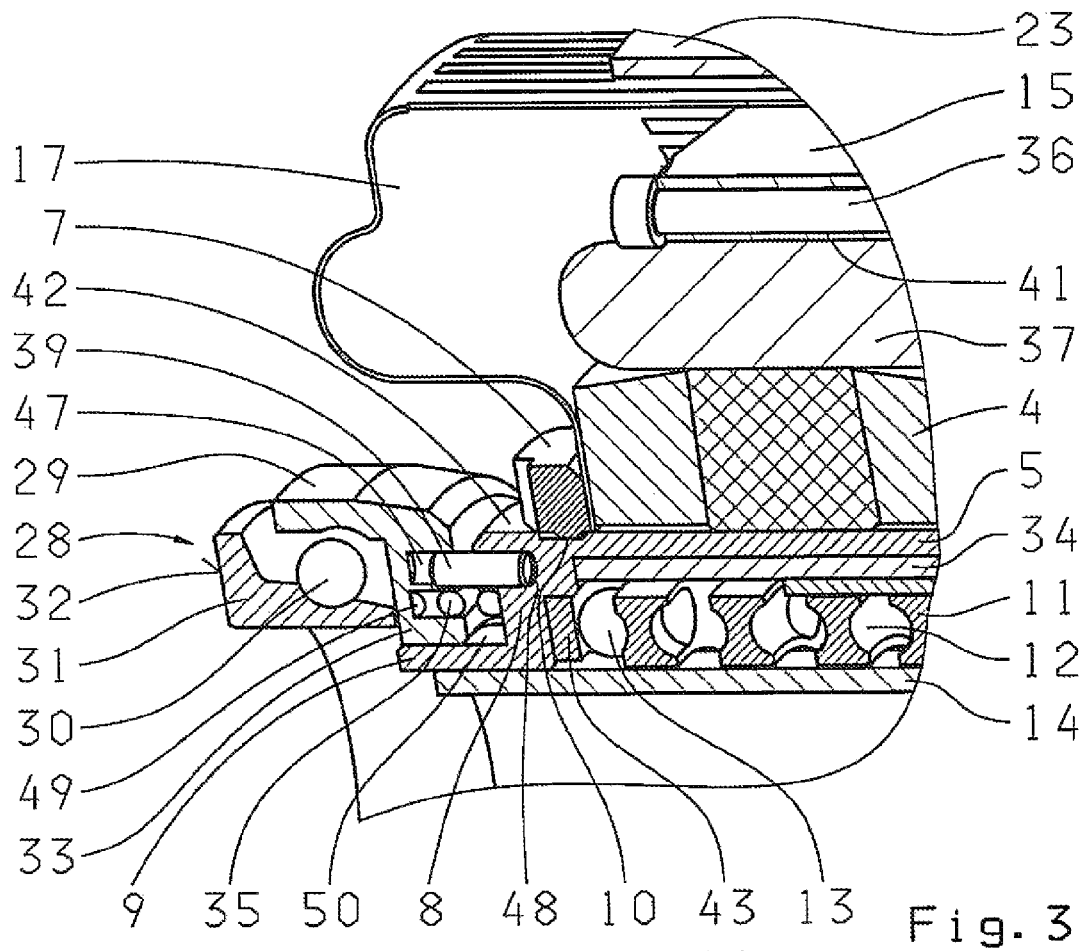
FIG. 3—a sectional enlargement from FIG. 1 in the area of the clutch release bearing of the actuator.

As FIGS. 1 and 3 illustrate, a sensor wheel 17 having detectable profiling 18 is secured between the armature nut 7 and the armature 4 by means of a radial clamping section 19 of the sensor wheel. Starting from the clamping section 19, the sensor wheel 17 has a first axial section 20 that axially overlaps the armature nut 7 and the armature seat 5, at least partially, thus exerting a certain protective function for this area. This first axial section 20 is followed by a radial section 21, which, in turn, is followed by a second axial section 22 of the sensor wheel 17 that overlaps the first axial section 20, said sensor wheel 17 having the detectable profiling 18.

The profiling 18 in this embodiment is formed by cutouts in the second axial section 22 of the sensor wheel 17 that are arranged one after the other relative to the circumference.

A spacer ring 24 along with a sensor carrier plate 23 on it are attached to the stator mounting plate 16, said sensor carrier plate 23 axially overlapping the profiling of the sensor wheel 17, at least partially. On the sensor carrier plate 23, there is a sensor holder 26 to which a speed sensor or a torque angle sensor 25 is attached. The sensitive side of this sensor 25 faces the profiling 18 of the sensor wheel 17 so that, when this profiling 18 is moved past the sensor, sensor signals are triggered that are transmitted to the control unit (not shown here). Using these sensor signals, the control unit generates control commands pertaining to the rotational direction and to the activation or stoppage of the electric motor 3, so that the axial travel of the actuator 1 can be set very precisely. Between the stator mounting plate 16 and the stator winding 37, there is a receiving space 40 for electric cables of the electric motor 3.

The structural design of the actuator 1 that has been described so far is actually sufficient for this actuator 1 to move vehicle parts such as, for example, the depicted diaphragm spring 2. For this purpose, the front surface of the ring flange 8 extending radially towards the inside merely has to act upon such a vehicle part and/or has to be non-positively connected to this part. Such a utilization of the actuator 1 is practical, for example, if the vehicle part that is to be deflected does not execute a rotational movement. In contrast, in order to deflect rotating parts, a rotation uncoupling from the actuator 1 is necessary, which will be described below.

For purposes of the rotation uncoupling, between the diaphragm spring 2 —which is to be actuated and which is rotating at the speed of the vehicle drive engine —and the armature seat 5, a clutch release bearing 28 is arranged on the actuator 1 which, in this embodiment, is configured as a single-row angular ball bearing in which bearing balls 30 are arranged between an outer ring 29 and an inner ring 31.

In order for an adjusting movement of the armature seat 5 to be transmitted to the diaphragm spring 2 via the clutch release bearing 28, the front surface of the armature seat 5 facing the diaphragm spring 2 can be axially laid on the outer ring 29 of the clutch release bearing 28, while the front surface 32 of the inner ring 31 of the clutch release bearing 28 facing away from the threaded nut 5 lies against the diaphragm spring 2.

For purposes of permanently mounting the clutch release bearing 28 on the actuator 1, the end of the armature seat 5 on the clutch release bearing side is configured in a special manner. Thus, it is provided that, adjacent to the ring flange 8 of the armature seat 5 facing radially towards the inside, there is an outer ring seat 9 on whose radially outer circumferential surface 50 the outer ring 29 of the clutch release bearing 28 lies with a radially inner axial section 33, where it is axially movable to a limited extent.

In order to guide and rotationally secure the outer ring 29 on this outer ring seat 9, bores 47 and 48 that are associated with each other are present in the opposing front surfaces of the outer ring 29 and armature seat 5, and a pin 39 that joins these two components is inserted into each of these bores. These pins 39 are preferably permanently pressed into the armature seat 5 and inserted with little radial play into the appropriate bore 47 in the outer ring 29.

In particular, an uncoupling spring 35 arranged axially between the outer ring 29 of the clutch release bearing 28 and the armature seat 5 serves to avoid the transfer of vibrations from the drive machine, for example, an internal combustion engine of the vehicle, into the actuator 1.

As can be seen especially in FIG. 3, this uncoupling spring 35 is arranged radially below the pins 39. With one of its axial ends, the uncoupling spring 35 is supported on the front surface of the armature seat 5 facing the clutch release bearing 28 or on the ring flange 8 facing radially towards the inside and with its other axial end, the uncoupling spring 35 lies in an axial ring groove 49 formed in the outer ring 29.

The uncoupling spring 35 also serves the purpose that, when the armature seat 5 executes an axial movement away from the diaphragm spring 2, the uncoupling spring 35 holds the outer ring 29 in a desired position relative to the inner ring 31 and also holds the inner ring 31 in contact with the diaphragm spring 2, even when a force F exerted by the diaphragm spring 2 onto the inner ring 31 of the clutch release bearing 28 drops to the value of zero.

What is claimed is:

1. An electromotive actuator for deflecting a mechanical part, the actuator comprising:

a deflection gear including a ball-ramp adjustment device having a rotatable component acting directly or indirectly on the mechanical part and a non-rotatable component; and an electric motor having a rotor, wherein the rotatable component is non-rotatably connected to the rotor so as to be linearly moveable relative to the non-rotatable component between a first position and a second position;

wherein the ball-ramp adjustment device includes a plurality of adjusting rings disposed axially adjacent to each other, a rotatable seat ring disposed at a first axial end, and a non-rotatable seat ring disposed at a second axial end opposite the first axial end;

wherein each of the plurality of adjusting rings has guide tracks on both sides and wherein the rotatable seat ring and the non-rotatable seat ring each has guide tracks on one side, such that each corresponding pair of axially facing guide tracks is configured to receive an associated ball.

2. The actuator as recited in claim 1, wherein the electric motor includes an armature seat, wherein the rotatable seat ring is fixedly connected to the armature seat and wherein the non-rotatable seat ring is fixedly connected to a guide tube affixed to a housing.

3. The actuator as recited in claim 2, wherein the armature seat is disposed so as to be axially movable with respect to the guide tube by means of the ball-ramp adjustment device.

4. The actuator as recited in claim 2, wherein the armature seat has a first ring flange extending radially outwardly and a second ring flange extending radially inwardly.

5. The actuator as recited in claim 4, wherein the armature seat includes a thread on a radially outer circumferential surface of the second ring flange, an armature nut being screwable onto the thread.

6. The actuator as recited in claim 5, wherein the rotor is disposed and clamped between an armature nut screwed onto the armature seat and the first ring flange.

7. The actuator as recited in claim 5, further comprising a sensor wheel having detectable profiling clamped between the armature nut and the rotor by means of a radial clamping section.

8. The actuator as recited in claim 7, wherein the sensor wheel has a first axial section at least partially axially overlapping the armature nut and the armature seat, a second axial section having the detectable profiling, and a radial section between the first and second axial sections.

9. The actuator as recited in claim 7, further comprising a ring-shaped sensor carrier plate disposed radially outside the sensor wheel and fixedly connected via a spacer ring to the stator mounting plate.

10. The actuator as recited in claim 9, further comprising at least one of a speed sensor and a torque angle sensor facing radially inwardly attached to the sensor carrier plate and wherein the profiling is detectable by the at least one of the speed sensor and the torque angle sensor.

11. The actuator as recited in claim 5, wherein the thread is a self-locking thread.

12. The actuator as recited in claim 2, wherein the guide tube is connectable to at least one of a clutch bell housing and a gear housing.

13. The actuator as recited in claim 2, wherein a front surface of the armature seat facing the mechanical part is directly or indirectly operatively connected to the part.

14. The actuator as recited in claim 13, wherein the front surface of the armature seat is operatively connected to a clutch release bearing that acts upon the mechanical part.

15. The actuator as recited in claim 13, wherein the front surface of the armature seat is capable of being disposed axially against an outer ring of a clutch release bearing.

16. The actuator as recited in claim 13, wherein a front surface of an inner ring of the clutch release bearing facing away from a threaded nut lies against the mechanical part.

17. The actuator as recited in claim 14, wherein the armature seat has a ring flange extending radially inwardly and an armature outer ring seat and wherein the clutch release bearing includes a clutch release bearing outer ring seat mounted on the armature outer ring seat so as to be axially movable.

18. The actuator as recited in claim 17, wherein the clutch release bearing outer ring seat has a radially inner axial section contacting the armature outer ring seat.

19. The actuator as recited in claim 17, wherein bores associated with each other are disposed in opposing front surfaces of the clutch release bearing outer ring seat and the armature seat, and wherein a pin joining the clutch release bearing outer ring seat and the armature seat is disposed into each of the bores, so as to guide and rotationally secure the clutch release bearing outer ring seat.

20. The actuator as recited in claim 17, further comprising an uncoupling spring disposed axially between the clutch release bearing outer ring seat and the armature seat, the uncoupling spring preventing a transmission of axial vibrations to the actuator from the mechanical part, and wherein, when the armature seat executes an axial movement away from the mechanical part, the uncoupling spring holds the clutch release bearing outer ring seat in a desired position relative to a clutch release bearing inner ring and also holds the clutch release bearing inner ring in contact with the mechanical part even when a force exerted by the mechanical part onto the clutch release bearing inner ring drops to a value of zero.

21. The actuator as recited in claim 20, wherein the uncoupling spring includes a helical compression spring.

22. The actuator as recited in claim 1, wherein the plurality of adjusting rings are radially not supported or radially supported by a sliding bearing.

23. The actuator as recited in claim 1, wherein each of the guide tracks have a length and a depth, the depth varying along the length.

24. The actuator as recited in claim 23, wherein each of the guide tracks are configured to form a ramp.

25. The actuator as recited in claim 24, wherein each corresponding pair of axially facing guide tracks are configured to overlap radially in an axial projection.

26. The actuator as recited in claim 24, wherein each corresponding pair of axially facing guide tracks are configured such that a largest axial relative travel of the rotatable component occurs when appertaining areas having a smallest depth are disposed axially opposite from each other and a smallest relative travel of the rotatable component occurs when the appertaining areas having a largest depth are disposed axially opposite from each other.

27. The actuator as recited in claim 1, wherein the electric motor includes a stator winding, a stator yoke and a stator mounting plate connected to the non-rotatable part, wherein the stator winding is connected to the stator yoke, the stator yoke is fixedly connected to the stator mounting plate.

28. The actuator as recited in claim 1, wherein the actuator is adapted for use in a vehicle actuation device, wherein the vehicle actuation device includes the mechanical part, and wherein the mechanical part is a deflectable component of a starting and shifting clutch or of its diaphragm spring, of a gear brake, of a shift track actuator or of a gear actuator or a slip coupling of a gear coupling device and/or a gear synchronization device of an automatic transmission or of a shifting clutch on a differential gear.

\* \* \* \* \*